United States Patent
Memili et al.

(10) Patent No.: US 10,137,941 B2
(45) Date of Patent: Nov. 27, 2018

(54) VEHICLE BODY COMPONENT

(71) Applicant: Ford Global Technologies, LLC, Dearborn, MI (US)

(72) Inventors: Selahattin Türel Memili, Duisburg (DE); Raphael Koch, Odenthal (DE); Igor Licko, Piešťany (SK)

(73) Assignee: Ford Global Technologies, LLC, Dearborn, MI (US)

( * ) Notice: Subject to any disclaimer, the term of this patent is extended or adjusted under 35 U.S.C. 154(b) by 54 days.

(21) Appl. No.: 15/371,875

(22) Filed: Dec. 7, 2016

(65) Prior Publication Data

US 2017/0166261 A1  Jun. 15, 2017

(30) Foreign Application Priority Data

Dec. 9, 2015 (DE) .................. 10 2015 224 698

(51) Int. Cl.
*B62D 29/00* (2006.01)
*B29C 65/06* (2006.01)
*B29C 65/00* (2006.01)
*B62D 25/04* (2006.01)
*B62D 25/06* (2006.01)
*B62D 29/04* (2006.01)
*B29K 307/04* (2006.01)
*B29K 309/08* (2006.01)
*B29K 705/12* (2006.01)
*B29L 31/30* (2006.01)

(52) U.S. Cl.
CPC ........ *B62D 29/005* (2013.01); *B29C 65/0681* (2013.01); *B29C 66/712* (2013.01); *B29C 66/74283* (2013.01); *B62D 25/04* (2013.01); *B62D 25/06* (2013.01); *B62D 29/043* (2013.01); *B29K 2307/04* (2013.01); *B29K 2309/08* (2013.01); *B29K 2705/12* (2013.01); *B29L 2031/30* (2013.01)

(58) Field of Classification Search
CPC ............................. B62D 25/04; B62D 29/005
USPC ............................................ 296/193.06, 29
See application file for complete search history.

(56) References Cited

U.S. PATENT DOCUMENTS

2008/0156425 A1* 7/2008 Howe .................. B62D 25/04
156/245
2010/0089977 A1 4/2010 Chen et al.
(Continued)

FOREIGN PATENT DOCUMENTS

DE  102006027546  12/2007
DE  102011085590  5/2013
(Continued)

OTHER PUBLICATIONS

J.V. Esteves et al, Friction spot joining of aluminum AA6181-T4 and carbon fiber-reinforced poly(phenylene sulfide): Effects of process parameters on the microstructure and mechanical strength, Materials & Design, Feb. 5, 2015, pp. 437-445, vol. 66, Part B.

*Primary Examiner* — Jason S Morrow
(74) *Attorney, Agent, or Firm* — Burris Law, PLLC

(57) ABSTRACT

A vehicle body component includes a basic element reinforced with a reinforcing element of fiber-reinforced plastics material. The basic element reinforced with the reinforcing element is a basic element of a pillar of a vehicle body or a roof element. The reinforcing element has a constant thickness or a variable thickness.

20 Claims, 2 Drawing Sheets

(56) References Cited

U.S. PATENT DOCUMENTS

| | | | | |
|---|---|---|---|---|
| 2011/0101734 A1* | 5/2011 | Gunther | ................. | B62D 25/04 |
| | | | | 296/193.06 |
| 2012/0280534 A1* | 11/2012 | Eipper | ................... | B62D 21/09 |
| | | | | 296/187.01 |
| 2015/0352753 A1* | 12/2015 | Konrad | ................... | B29C 70/42 |
| | | | | 428/221 |
| 2017/0327157 A1* | 11/2017 | Jaunasse | .............. | B62D 29/004 |
| 2018/0065681 A1* | 3/2018 | Steffens | ................. | B62D 25/04 |

FOREIGN PATENT DOCUMENTS

| | | |
|---|---|---|
| DE | 102012203888 | 9/2013 |
| EP | 2329905 | 6/2011 |
| EP | 2689882 | 1/2014 |

\* cited by examiner

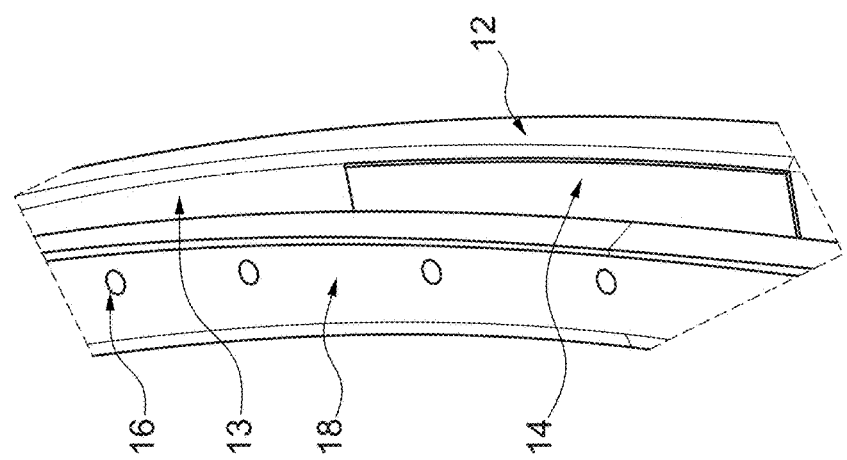
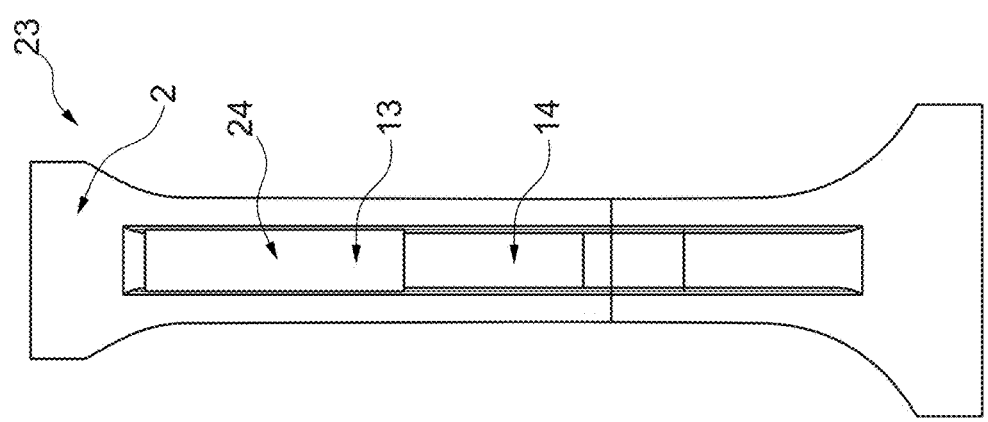

VEHICLE BODY COMPONENT

CROSS-REFERENCE TO RELATED APPLICATIONS

This application claims the benefit of DE 10 2015 224 698.1, filed on Dec. 9, 2015. The disclosure of the above application is incorporated herein by reference.

FIELD

The present disclosure relates to a vehicle body component and more specifically to a vehicle body component having fiber-reinforced plastic materials.

BACKGROUND

The statements in this section merely provide background information related to the present disclosure and may not constitute prior art.

An automotive body unit with a sheet metal component which is reinforced with a reinforcing component of a fiber composite material attached extensively thereto is disclosed in DE 10 2012 203 888 A1. As formulated as a problem in DE 10 2012 203 888 A1, such hybrid components cannot be joined to other components in the region of the reinforcing component using joining methods conventional in vehicle construction, such as for example spot welding. DE 10 2012 203 888 A1 therefore proposes that the reinforcing component comprise at least one opening, such that the sheet metal component can be joined to another sheet metal component in the region of the opening using a conventional joining method. The sheet metal component is a sill panel reinforcing plate. The reinforcing component includes a carbon fiber-reinforced plastics material, the sheet metal component including a weldable iron material.

EP 2 689 882 A2 discloses a device and a method for friction stir welding. Here, two different metal sheets, i.e. one aluminum sheet and one steel sheet, are joined together. A filler material is used to close a joining crater.

US 2010/0089977 A1 also relates to friction stir welding of different materials. Here, an aluminum sheet is joined to a magnesium sheet, wherein combinations of copper, tin and zinc and other powders could strengthen the magnesium-containing and aluminum-containing friction stir weld material.

In automotive construction, it is advantageous, especially with regard to the body, for the latter to be particularly light. This saves fuel and thereby also reduces the emission of noxious gases, such as for example $CO_2$. In different zones, the structural, i.e. body, components, need to be designed for very different loads. In this respect, the components have also to be produced in such a way as to achieve the most lightweight construction possible while losing as little material as possible. In regions which are exposed to particularly heavy loads, reinforcing measures may therefore also be provided. The components may for example be made from a basic element, and comprise thickened portions in places as reinforcing measures. "Tailored rolled blanks" are known. Tailored rolled blanks are however very complicated to produce, and in this respect also very costly. It is also disadvantageous that the entire component has to be disposed of in the case of just one rolling defect, no matter how small, since it then no longer meets requirements. It is however also conceivable to provide separate reinforcing elements on the basic element which may include fiber-reinforced plastics material. As has already been disclosed in DE 10 2012 203 888 A1, conventional joining methods are unsuitable. Reinforcing elements may be joined to the basic element using adhesively bonded joints, reinforcing said basic element in such a way that the anticipated loads may be absorbed by the vehicle body component. Adhesively bonded joints do not however allow the maximum possible joining power to be achieved. In this respect, additional mechanical joints are also necessary, which may however destroy the fibers of the fiber-reinforced plastics material, so negating the desired reinforcement. For example, reinforcing elements may be fastened to the basic element using rivets, which inevitably destroy the fibers in the region of the joint. In addition, shearing and cracking forces of the original joint may be reduced, wherein corrosion problems may also occur.

The article "Friction spot joining of aluminum AA6181-T4 and carbon fiber-reinforced poly(phenylene sulfide): Effects of process parameters on the microstructure and mechanical strength" (material and design 66 (2015), 437-445) relates to the possible joining of an aluminum sheet with a fiber-reinforced plastics material, reference also being made to EP 2 329 905 B1.

EP 2 329 905 B1 discloses a refilling friction stir welding method, in which a light metal sheet is joined to a fiber-reinforced plastics material. The friction stir welding device comprises a pin, a sleeve and a clamping ring. This device is intended to make it possible to close the friction welding crater with the friction stir welding device in the course of the welding process, wherein the fiber-reinforced plastics material is melted but the fibers should remain undamaged. Once rotation has stopped, the materials harden, such that the previously melted regions adhere to one another. In this respect, it is however explicitly stated that the known disadvantages of adhesive bonding are ruled out since no separate adhesive is used.

SUMMARY

The present disclosure provides a vehicle body component that has reduced manufacturing effort and reduced weight, while still meeting rigidity and/or crash requirements.

It should be noted that the features and measures listed individually in the following description may be combined in any desired, technically expedient manner and disclose further configurations of the present disclosure.

A vehicle body component is provided which comprises a basic element which is reinforced with a reinforcing element of fiber-reinforced plastics material. According to the present disclosure, the basic element reinforced with the reinforcing element is a basic element of a pillar, i.e. an A, B, C, or D pillar, or a roof element of a vehicle body, wherein the reinforcing element has a constant thickness or a variable, i.e. varying, thickness.

In one form, the reinforcing element is joined at least in places at least in a form-fitting manner with the basic element. The form-fitting joint may be produced for example using a refilling friction stir welding device. A number of starting points for the friction stir welding device may be provided. The form-fitting joint regions are here spaced apart in a manner similar to the spacing used with spot welded joints. On an active side of the basic element, i.e. on the side on which the friction stir welding device with the friction stir welding head acts, the basic element is substantially flat after joining, without craters and/or raised portions. On the opposing joint side of the basic element a raised portion is formed, which penetrates into the molten material of the corresponding joint side of the fiber-reinforced plastics material, such that the form-fitting joint is formed upon cooling of the materials. The plastics material, or matrix, of the fiber-reinforced reinforcing element melts due to the action of the frictional heat of the friction stir welding device. The raised portion may take the form of a ring, and correspond for instance to the configuration of the sleeve. On the opposing free side of the reinforcing element, the latter is likewise flat and without raised portions. Despite melting of the plastics material, the reinforcing fibers are not destroyed, so avoiding defects which could lead to a weakness in the vehicle body component. Owing to non-destruction of the fibers, i.e. to the stronger joint, heavier loads may be absorbed or distributed. Thus, the material thickness of the basic element may be reduced, which in turn has a positive effect with regard to reducing weight loading and thus to reducing fuel consumption and consequently pollutant emissions.

It is expedient if, in addition, a bonded joint is also provided, wherein the reinforcing element and/or the basic element is provided at least in places, in one form at the overlapping joint region, with a suitable adhesive prior to form-fitting joining, such that an additional adhesive joint is present. It is expedient, for the purposes of the present disclosure, for an adhesive to be applied over the entire region in which the reinforcing element lies against the basic element. In this way, a form-fitting joint is combined with a separate adhesive joint, such that a particularly reliable joint is provided between the elements. This represents a completely new approach, which allows flexibility of the basic element together with the reinforcing element in terms of the configuration of the vehicle body component, in particular of the B pillar, to allow the absorption of greater loads while observing increased weight reduction. As a result of this combination, even heavier loading may be achieved, wherein the material thickness of the basic element may be reduced still further, which in turn has a positive effect with regard to reducing weight loading and thus to reducing fuel consumption and consequently pollutant emissions.

The combination of a form-fitting joint with a separate bonded joint in the form of an adhesive joint between the reinforcing element and the basic element has a positive effect.

The basic element may be a metal sheet, which has been separated from a rolled strip and has for example been appropriately formed in a rolling process or in a press. The basic element may however also be a casting. So that the basic element may be produced particularly simply, provision is made according to the present disclosure for the basic element to have a constant thickness over its entire extent both in the longitudinal direction and in the transverse direction. The complicated production process needed for a "tailored rolled" basic element can thus be omitted. In this respect, the basic element may in one form be produced by pressing. The basic element is formed or cast into the desired shape merely by simple rolling steps or pressing and already has certain characteristics at least with regard to rigidity and/or crash requirements. The desired target characteristic is achieved with the reinforcing element.

The basic element may be a metal, i.e. steel material, or of a light metal, i.e. for example of aluminum or magnesium. For the purposes of the present disclosure, aluminum and magnesium each also encompass their respective alloys.

According to the present disclosure, the reinforcing element is a fiber-reinforced plastics material. This is particularly light but lends the basic element the desired target characteristics. The fiber-reinforced plastics material may be a carbon fiber-reinforced plastics material (CFRP). The fiber-reinforced plastics material may be a glass fiber-reinforced plastics material (GFRP).

In a first configuration, the reinforcing element may have a constant thickness, and be arranged at the desired region of the basic element which is to be reinforced according to the design criteria.

In a further configuration, the reinforcing element may have a variable thickness, i.e. a varying thickness, and be arranged at the desired region of the basic element which is to be reinforced according to the design criteria. In this way, the basic element reinforced in this way, although not in the form of a tailored rolled blank, may nonetheless have regions with different thicknesses, i.e. with different characteristics. This allows production at a particularly reasonable price compared with conventional tailored rolled blanks.

It makes good sense for the reinforcing element to be produced to match the desired characteristics of the basic element to be reinforced therewith, wherein the latter may be produced as a simply shaped or cast basic element of light metal or iron material. Such a procedure also allows savings to be made with regard to the very expensive basic material of the basic element, since the latter does not have to be produced with the target characteristic but rather can virtually be undersized. In particular, the reinforcing element may be produced in such a way that the material thickness of the basic element is reduced, i.e. as thin as possible.

It is also appropriate for the reinforcing element to be produced not only so as to be conformed to the shape of the basic element, preferably to the region thereof to be reinforced, but also in accordance with the desired characteristics which it is intended to achieve with the reinforcing element. As a result of the above-mentioned combination of the form-fitting joint with the bonded adhesive joint, it is also possible to establish the necessary target requirements while omitting further mechanical joints such as for example clips or rivets.

The basic element reinforced with the reinforcing element is in particular a basic element of a B pillar. In this case, the reinforcing element may either be arranged on the outside or the inside or on both the outside and the inside. In the assembled state, provision is preferably made for the reinforcing element to be arranged on an outward-facing side of the vehicle body. One advantage of the fiber-reinforced reinforcing element together with the basic element in the form of the B pillar lies in the very high rigidity alongside the possibility of improved energy absorption.

The basic element reinforced with the reinforcing element may however also be a roof panel. In this case, it is appropriate to arrange the reinforcing element as a top element on the roof panel, such that the roof element is thus overall made more rigid. The roof panel could also of course initially be undersized, and reinforced appropriately by the reinforcing element in such a way as to meet requirements. If the basic element is a roof panel, it is also appropriate for specific regions of the roof panel to be embodied with reinforcing elements of constant thickness and for other regions to be embodied with reinforcing elements of variable thickness. In particular, regions which absorb more load forces during a crash may additionally be joined to "tailored" reinforcing elements, i.e. to reinforcing elements of variable thickness, for which refilling friction stir welding is likewise suitable. It is additionally appropriate to provide additional adhesive joints, as already mentioned.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 4 is a front view of a vehicle body component comprising a basic element with a reinforcing element in a second configuration constructed in accordance with the principles of the present disclosure; and FIG. 5 shows a magnified portion of FIG. 4.

Figure 3:
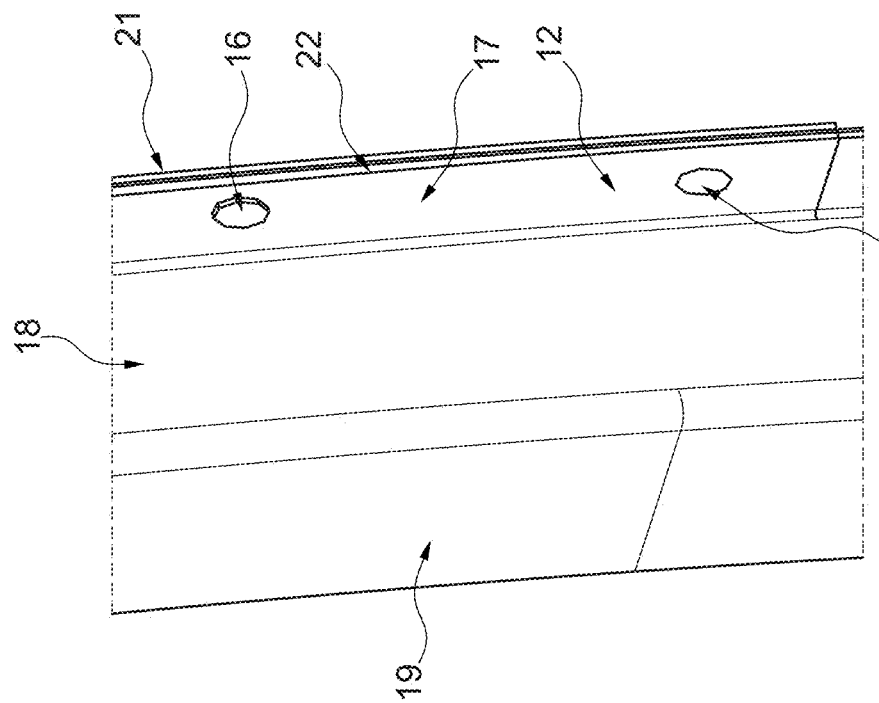
FIG. 3 shows a magnified portion of FIG. 2.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Identical parts are always provided in the various figures with the same reference numerals, for which reason they are as a rule described only once.

Figure 1:
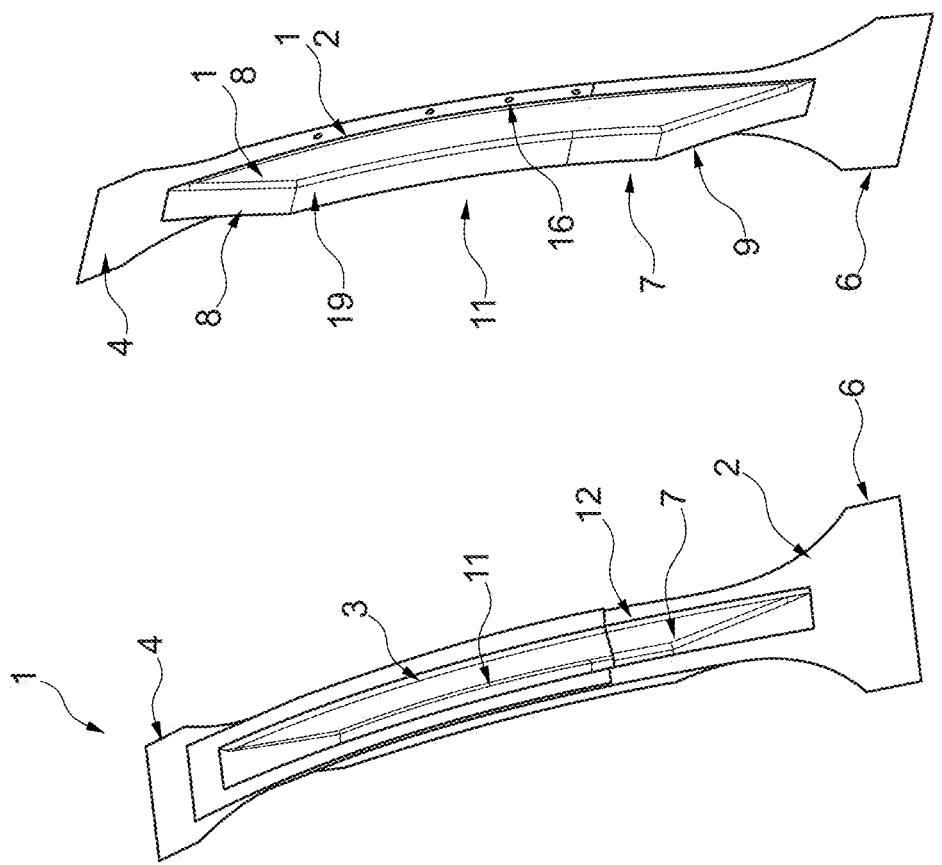
FIG. 1 is a perspective front view of a vehicle body component comprising a basic element with a reinforcing element in a first configuration constructed in accordance with the principles of the present disclosure.

FIG. 1 shows a vehicle body component 1 comprising a basic element 2 which has been reinforced with a reinforcing element 3. According to the present disclosure, the basic element 2 reinforced with the reinforcing element 3 is a basic element of a pillar, i.e. a B pillar of a vehicle body, wherein the reinforcing element 3 is formed of a fiber-reinforced plastics material, preferably of carbon fiber-reinforced plastics material and in a first form has a constant thickness. The basic element 2 has a constant thickness. The reinforcing element 3 may also be formed from a glass fiber-reinforced plastics material.

The basic element 2 comprises a roof joint region 4 and a sill joint region 6 opposite thereto. The two regions 4 and 6 are by way of example planar in shape as shown. A recess 7 is arranged between the two regions 4 and 6. The recess 7 comprises obliquely extending transitional regions 8 and 9 both at the roof end and at the sill end, these regions each leading into a central region 11. Flanges 12 are arranged laterally on the basic element 2. On both sides of a midline, the flange 12 develops in each case curved in the same orientation into the roof joint region 4 and the sill joint region 6.

The basic element 2 may thus have been formed in a rolling process or in a pressing process from a rolled sheet, or cast as a casting. The basic element 2 may include a light metal or of a steel material.

The reinforcing element 3 is for example arranged in places on the basic element 2. As is apparent, the reinforcing element 3 starts at a distance from the roof joint region 4 and extends towards the sill joint region 6, ending before reaching the latter. By way of example, the reinforcing element 3 extends, when viewed in the longitudinal extent, i.e. in the plane of the drawing, from the top downwards over half of the basic element 2. Thus, the basic element reinforced with the reinforcing element has the target characteristic of the vehicle body component 1, i.e. for example of the B pillar. Of course, the reinforcing element 3 may also cover more or less than illustrated of the basic element 2.

It is significant that the basic element 2 is produced without a special configuration, as known in the case of tailored rolled blanks, but nonetheless has the necessary characteristics for example with regard to rigidity and crash behavior, brought about by means of the reinforcing element 3. In addition, the vehicle body component 1 is lighter than if a tailored rolled blank made from the basic material is formed into the basic element.

The reinforcing element 3 and the basic element 2 are joined in form-fitting manner by refilling friction stir welding. In addition, an additional bonded joint, i.e. an adhesive joint, is also provided in one form of the present disclosure.

Figure 2:
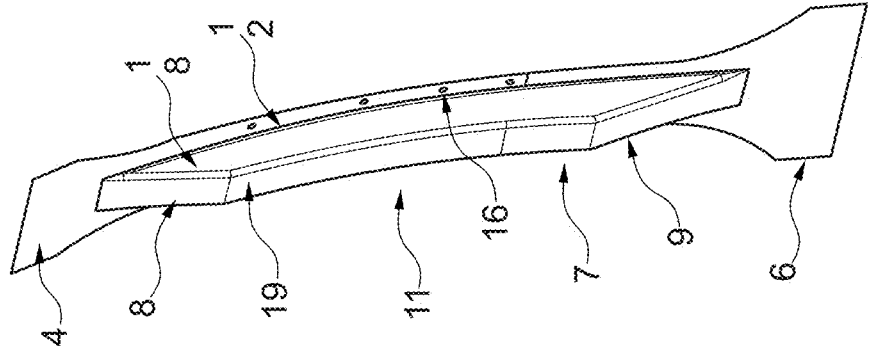
FIG. 2 shows the vehicle body component of FIG. 1 in a perspective rear view.

The friction stir welded joints 16 are visible for example in FIGS. 2 and 3. As is apparent, these are spaced apart in the manner of spot welded joints. They are only particularly emphasized for reasons of illustration. In principle, the side on which the friction stir welded joints in FIGS. 2 and 3 are apparent is substantially flat after friction stir welding.

The friction stir welded joints 16 are produced with a refilling friction stir welding device, which comprises a pin, a sleeve and a clamping ring. In this case, friction stir welding is carried out in four phases: friction, first pressing, second pressing and withdrawal. The clamping ring holds the basic element in position and hinders, i.e. prevents, material flow during the process. While the pin and the sleeve begin rotation in the same direction, these may move mutually independently in the axial direction. In this case, the pin for example penetrates the material while the sleeve is moved upwards. In this way, a space is formed for the plasticized, i.e. melted material. Once the desired depth has been reached, the pin and sleeve are reversed in the axial direction of movement, such that the sleeve is moved towards the basic element and the pin is withdrawn. In this way, the material collected in the welding crater is transported back, such that a substantially flat, crater-free surface is formed. Penetration depth is such that the fibers are not touched, i.e. destroyed, the frictional heat being sufficient to melt the material of the basic element and also the plastics material. However, a form-fit is produced by the sleeve on the joint sides of the basic element and the reinforcing element facing one another in that a raised portion on the basic element side engages in the molten plastics material of the reinforcing element and remains in this position on cooling of the plastics material. For the purposes of the present disclosure, this form-fitting joint is reinforced still more if a bonded joint, preferably an adhesive joint, is combined therewith. In this case, adhesive is applied to the mutually facing joint faces of the basic element and/or reinforcing element prior to production of the form-fitting joint. The adhesive joint may harden further.

The friction stir welding device acts on an active side 17 of the basic element 2, i.e. preferably on the free side of the basic element 2, by way of example on the respective flange 12, wherein this active, i.e. free side 17, as apparent by way of example in FIGS. 2 and 3, is opposite the reinforcing element 3. By way of example, the friction stir welding device produces the form-fitting joints on the flanges 12. These may however also be arranged additionally or only on the side flanks 18 of the recess 7, and/or on the base 19 of the recess 7. On the side flanks 18, the base and/or the flanges 12 or on the corresponding regions of the reinforcing element 3, adhesives may also be arranged to produce the bonded joint.

The reinforcing element 2 is produced to correspond to the desired target characteristics of the respective B pillar. By way of example, it is embodied to correspond to the recess with its side flanks 18 and its base 19 and to the flanges 12. As is apparent, the reinforcing element 3 is guided into the transitional regions 8 and 9 but not completely conformed to the transitional regions 8 and 9. The reinforcing element 3 terminates with its end edge 21 flush with the end edge 22 of the flange 12 of the basic element 2.

FIG. 4 shows a vehicle body component 23 with a basic element 2 and a reinforcing element 24 in a second configuration. The basic element 2 has a constant thickness, and is embodied identically to the form according to FIGS. 1 to 3 as the basic element of a B pillar.

The reinforcing element 24 is formed of a fiber-reinforced plastics material and has a variable thickness. In this respect, the reinforcing element 24 has a region 13 which is thicker than another region 14. By way of example, only two regions 13 and 14 of different thicknesses are apparent. Of course, more than two regions may also have different thicknesses. Regions may also be provided which are spaced apart but have the same thickness, wherein one or more regions may be arranged therebetween which are thinner or thicker than the respective other regions.

In the exemplary form shown in FIG. 4, the flanges 12 of the basic element 2 are free, i.e. not covered by the reinforcing element 24. The reinforcing element 24 is accordingly, by way of example, merely conformed to the configuration of the recess 7 with the side flanks 18 and the base 19. This may thus also apply to the reinforcing element 3 according to FIGS. 1 to 3.

The reinforcing element 24 may be produced so as to be conformable in its longitudinal extent and with its variable thickness to the desired characteristics. Like the reinforcing element 3, the reinforcing element 24 in its longitudinal extent covers for instance half of the basic element 2. The reinforcing element 24 is inserted into the recess 7 without covering the flanges 12, as already mentioned.

The friction stir welded joints 16 are, by way of example, arranged on the side flanks 18 (FIG. 5), but may also be arranged additionally or solely on the base 19. An additional adhesive joint may also be provided, as already described.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle body component comprising:
   a basic element;
   a reinforcing element reinforcing the basic element, the reinforcing element being a fiber-reinforced plastics material and being joined form-fittingly at least in discrete locations to the basic element with at least one friction stir welded joint that joins the reinforcing element directly to a base, a flange, or a flank of the basic element without disturbing any fibers within the reinforcing element,
   wherein the basic element is a pillar of a vehicle body or a roof element of a vehicle,
   wherein the reinforcing element is bonded to the basic element by an adhesive layer that extends along the base and the flange of the basic element.

2. The vehicle body component according to claim 1, wherein the adhesive layer extends along substantially an entire region in which the reinforcing element overlaps the basic element.

3. The vehicle body component according to claim 1, wherein the basic element is selected from the group consisting of a formed metal sheet and a casting.

4. The vehicle body component according to claim 1, wherein the basic element is a steel material.

5. The vehicle body component according to claim 1, wherein the reinforcing element is selected from the group consisting of a carbon fiber-reinforced plastics material and a glass fiber-reinforced plastics material.

6. The vehicle body component according to claim 1, wherein an active side of the basic element is flat after friction stir welding.

7. The vehicle body component according to claim 1, wherein the reinforcing element is arranged on an inside of the basic element.

8. The vehicle body component according to claim 1, wherein the reinforcing element is arranged on an outside of the basic element.

9. The vehicle body component according to claim 1, wherein the reinforcing element has a constant thickness.

10. The vehicle body component according to claim 1, wherein the reinforcing element has a variable thickness.

11. A vehicle body component comprising:
    a basic element including a pair of first flanks and a first base that define a generally U-shaped central member;
    a reinforcing element reinforcing the basic element, the reinforcing element being a fiber-reinforced plastics material and being joined form-fittingly at least in discrete locations to the basic element, the reinforcing element including a pair of second flanks and a second base that define a generally U-shaped reinforcement body nested with the generally U-shape of the central member so that the first base contacts the second base and each first flank contacts one of the second flanks, the reinforcement body joined to the basic element by at least one friction stir welded joint and an adhesive,
    wherein the basic element is a pillar of a vehicle body or a roof element and is a material selected from the group consisting of steel, aluminum, and magnesium.

12. The vehicle body component according to claim 11, wherein the adhesive bonds the first base to the second base and bonds at least one of:
    a) the first flanks to the second flanks; and
    b) a pair of first flanges to a pair of second flanges, wherein the first flanges extend laterally outward from an inboard side of each first flank and the second flanges extend laterally outward from an inboard side of each second flank.

13. The vehicle body component according to claim 11, wherein the second base and the second flanks are nested inside the first base and first flanks of the basic element.

14. The vehicle body component according to claim 11, wherein the first base and the first flanks are nested inside the second base and the second flanks of the reinforcing element.

15. The vehicle body component according to claim 11, wherein the reinforcing element has a constant thickness.

16. The vehicle body component according to claim 11, wherein the reinforcing element has a variable thickness.

17. The vehicle body component according to claim 11, wherein the reinforcing element is selected from the group consisting of a carbon fiber-reinforced plastics material and a glass fiber-reinforced plastics material.

18. A vehicle body component comprising:
- a basic element comprising a material selected from the group consisting of steel, aluminum, and magnesium, the basic element including a pair of first flanges, a pair of first flanks, and a first base, the first flanks being spaced apart on opposite sides of a longitudinal axis of the basic element, the first base extending laterally between an outboard side of the first flanks to define a generally U-shaped central member, the first flanges extending laterally outward from an inboard side of the first flanks;
- a reinforcing element comprising a fiber-reinforced plastics material consisting of fibers and a matrix, the reinforcing element including a pair of second flanks and a second base, the second flanks being spaced apart on opposite sides of the longitudinal axis of the basic element and overlapping corresponding ones of the first flanks, the second base extending laterally between an outboard side of each second flank and overlapping the first base to define a generally U-shaped reinforcement body nested with the U-shaped central member, the reinforcement body being joined to the first base, the first flanges, or the first flanks by at least one friction stir welded joint, the reinforcement body extending longitudinally along a region of the U-shaped central member that is less than an entire longitudinal length of the U-shaped central member and being bonded to the U-shaped central member with an adhesive, wherein the matrix of the reinforcing element is melted at the stir welded joint and the fibers are undamaged.

19. The vehicle body component according to claim 18, wherein the adhesive bonds the first flanks to the second flanks and the first base to the second base.

20. The vehicle body component according to claim 18, wherein the reinforcing element has a variable thickness.

\* \* \* \* \*